United States Patent [19]
DeVault et al.

[11] Patent Number: 5,532,532
[45] Date of Patent: Jul. 2, 1996

[54] HERMETICALLY SEALED SUPERCONDUCTING MAGNET MOTOR

[75] Inventors: Robert C. DeVault; Benjamin W. McConnell, both of Knoxville, Tenn.; Benjamin A. Phillips, Benton Harbor, Mich.

[73] Assignee: Martin Marietta Energy Systems, Inc., Oak Ridge, Tenn.

[21] Appl. No.: 122,626

[22] Filed: Sep. 17, 1993

[51] Int. Cl.⁶ .................................................. H02K 9/00
[52] U.S. Cl. ............................. 310/52; 310/10; 310/86; 310/156
[58] Field of Search ................................ 310/10, 156, 52, 310/90.5, 85, 40 R, 86; 505/876, 877, 878

[56] References Cited

U.S. PATENT DOCUMENTS

| | | |
|---|---|---|
| 3,405,290 | 7/1965 | Halas . |
| 3,521,091 | 7/1970 | Halas . |
| 3,639,793 | 2/1972 | Appleton et al. . |
| 3,657,580 | 4/1972 | Doyle . |
| 3,670,187 | 6/1972 | Thum . |
| 3,764,835 | 10/1973 | Luck et al. . |
| 3,809,933 | 5/1974 | Sugawara et al. . |
| 3,916,229 | 10/1975 | Litz et al. ................... 310/52 |
| 3,934,163 | 1/1976 | Mailfert . |
| 4,385,248 | 5/1983 | Laskaris ..................... 310/52 |
| 4,577,126 | 3/1986 | Mailfert ...................... 310/52 |
| 4,808,864 | 2/1989 | Brunet et al. . |
| 4,820,945 | 4/1989 | Khutoretsky et al. . |
| 4,857,785 | 8/1989 | McCarty . |
| 4,885,494 | 12/1989 | Higashi . |
| 4,956,571 | 9/1990 | Godon et al. ............... 310/10 |
| 5,159,219 | 10/1992 | Chu et al. .................. 505/876 |
| 5,331,819 | 7/1994 | Matsuda et al. ........... 310/52 |
| 5,350,958 | 9/1994 | Ohnishi ...................... 310/52 |

Primary Examiner—R. Skudy
Attorney, Agent, or Firm—Edward A. Pennington; J. Donald Griffin; Harold W. Adams

[57] ABSTRACT

A hermetically sealed superconducting magnet motor includes a rotor separated from a stator by either a radial gap, an axial gap, or a combined axial and radial gap. Dual conically shaped stators are used in one embodiment to levitate a disc-shaped rotor made of superconducting material within a conduit for moving cryogenic fluid. As the rotor is caused to rotate when the field stator is energized, the fluid is pumped through the conduit.

15 Claims, 4 Drawing Sheets

HERMETICALLY SEALED SUPERCONDUCTING MAGNET MOTOR

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to electric motors and the use of superconducting materials in electric motor applications, and more specifically, to a hermetically sealed superconducting magnet motor in which a hermetic seal is disposed between the stator and armature.

BACKGROUND OF THE INVENTION

Although recent advances have been made in lowering transition temperatures, existing superconducting materials exhibit superconducting properties only at temperatures substantially below normal environmental conditions. In spite of this fact, practical uses of superconducting materials in electric machines, such as electric motors, have been envisioned.

One example is the electric motor described in U.S. Pat. No. 4,577,126 to Malifert. The motor has superconductive field windings formed of cylindrical windings having an axis about the axis of rotation of the rotor. The rotor may be solid or in the form of a shaft on which are secured one or more disks. The armature windings alternate with and overlap rotor disks such that the internal windings are interleaved or are interfitted between the disks of the rotor. The windings may be formed on flat insulating supports in the form of disks which can be made of glass fiber reinforced resin.

U.S. Pat. No. 4,385,248 to Laskaris describes a support structure for a superconducting winding of a motor which minimizes frictional heat losses developed by relative sliding motion at the interface between the superconducting electrical winding and a support structure. A plurality of superconducting conductors are bunched together in close thermal and electrical contact with one another in a solid winding bundle. The winding bundle is then treated with epoxy resin so that all the individual conductors are epoxyed together.

U.S. Pat. No. 3,521,091 to Halas describes an electric motor having an isolated superconducting field coil constructed of foil strips which are damped by placing two strips in a side-by-side relationship and connecting the end of one strip to the beginning of the other. The armature is maintained at a cryogenic temperature above its superconductive transition temperature and is also of foil strip construction to improve cooling and resist centrifugal crushing and cut through.

Heretofore, practical applications of superconducting motors have been limited due to the requirement for maintaining temperatures substantially below the temperatures experienced in the vast majority of real applications.

SUMMARY OF THE INVENTION

An object of the present invention is to provide means for allowing the use of superconducting components in electric motors which operate at normal temperatures, even though the superconducting components themselves are at whatever colder temperature is necessary for attaining superconducting properties.

Another object of the present invention is to provide a superconducting magnet motor using a minimal number of superconductive components.

Still another object of the present invention is to provide a superconducting magnet motor or machine which avoids or reduces the need for bearings by relying on the Meissner effect of a superconducting material.

These and other objects are met by providing a superconducting magnet machine which includes a stator, an armature in spaced relation to the stator, and a hermetic seal between the stator and armature, one of the stator and armature including a superconducting material which, when placed at a superconducting temperature, and when at least one of the armature and stator is coupled to a source of electrical energy, applies a repulsive force between the stator and armature.

Other objects, advantages and salient features of the invention will become apparent from the following detailed description, which, taken in conjunction with the annexed drawings, discloses preferred embodiments of the invention.

DETAILED DESCRIPTION OF THE PREFERRED EMBODIMENTS

Figure 1:
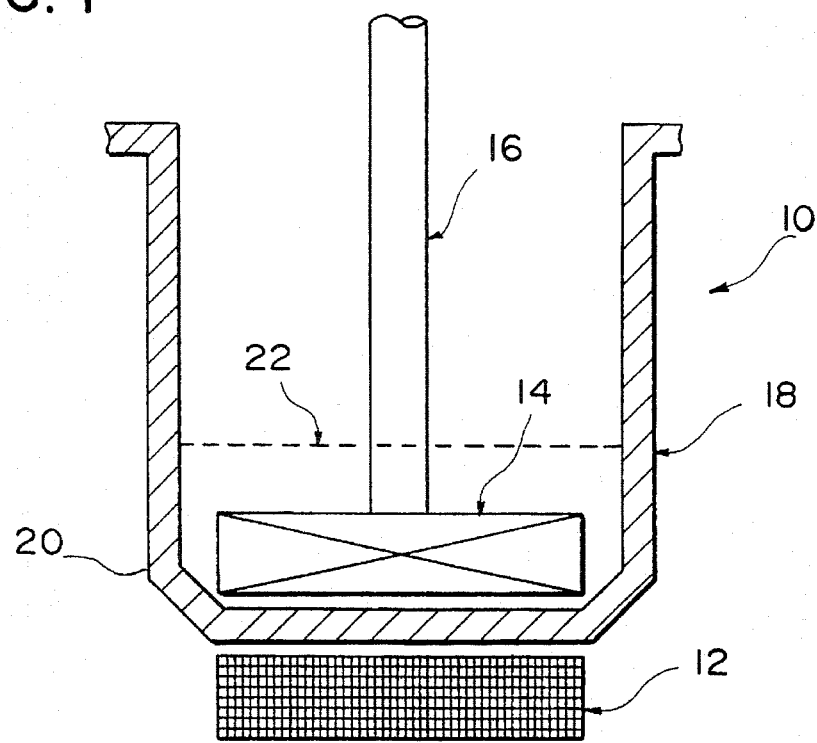
FIG. 1 is a schematic, vertical cross-sectional view of a superconducting magnet motor according to a first preferred embodiment of the present invention.

Referring to FIG. 1, a hermetically sealed superconducting magnet motor 10 is configured with an axial gap between a stator 12 and a superconducting magnet armature 14. The armature is connected to one end of a power output shaft 16, the opposite end of which may be connected to any suitable mechanism to be driven, such as a pump (not shown). The armature 14 is preferably made from superconducting materials and operated in persistent current conditions.

A hermetic seal 18 separates the stator 12 from the armature 14. The seal 18 may be made of non-magnetic materials such as stainless steel or non-metallic composites. It is intended to enclose the armature 14, the shaft 16 and the recipient of the rotational output of the shaft 16 (i.e., a pump). The seal 18 includes a sump portion 20 which contains a sufficient quantity of cryogenic fluid, such as liquid helium, to maintain the superconducting materials in the armature 14 at or below the transition temperature. In FIG. 1, the cryogenic fluid 22 is at a level which immerses the armature 14. Suitable means for circulating cryogenic fluid and removing gaseous fluid upon heating can be provided.

The stator 12 includes standard starting windings such as those found in commercially available motors. In particular, the stator 12 is substantially disk-shaped, as is of the type used in computer disk drive motors. Generally, the armature 14 is driven by the stator 12, which typically is D.C. electronically commutated. The stator 12 may be coupled to a 60 Hz A.C. power source (not shown) and a D.C. source (not shown). The power electronics used in conjunction with the stator and armature arrangements described herein are conventional and are not described in detail herein.

The superconductive materials used in the armature 14 is not limited herein. Thus, use of low temperature materials such as NbTi and $Ni_3Sn$ is possible as well as the newer high temperature superconductors such as BiSCo and YtBaCuO-123 and, potentially (should they ever develop) room temperature superconductors. In the latter case, cryogenic coolants would be unnecessary.

With respect to the FIG. 1 embodiment, virtually any motor configuration could be constructed, so long as the hermetic seal is used between the stator (or stators) and armature (or armatures).

Figure 2:
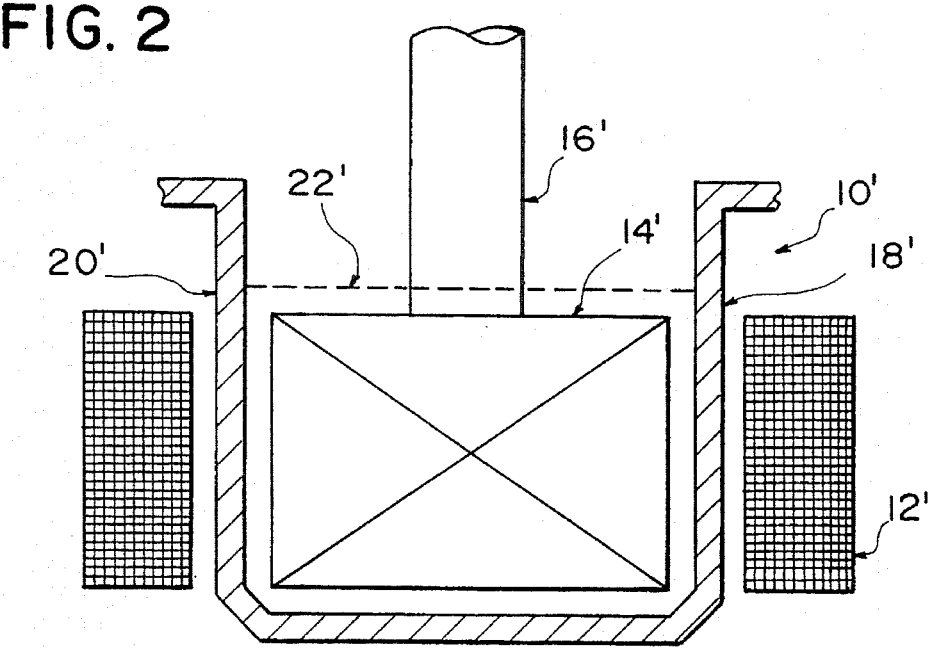
FIG. 2 is a schematic, vertical cross-sectional view of a superconducting magnet motor according to a second preferred embodiment of the present invention.

FIG. 2 is similar to FIG. 1 except that it illustrates a hermetically sealed superconducting magnet motor using a radial gap motor configuration. Equivalent, but primed, reference numerals are used in FIG. 2 to describe structure similar to that which is illustrated in FIG. 1.

Figure 3:
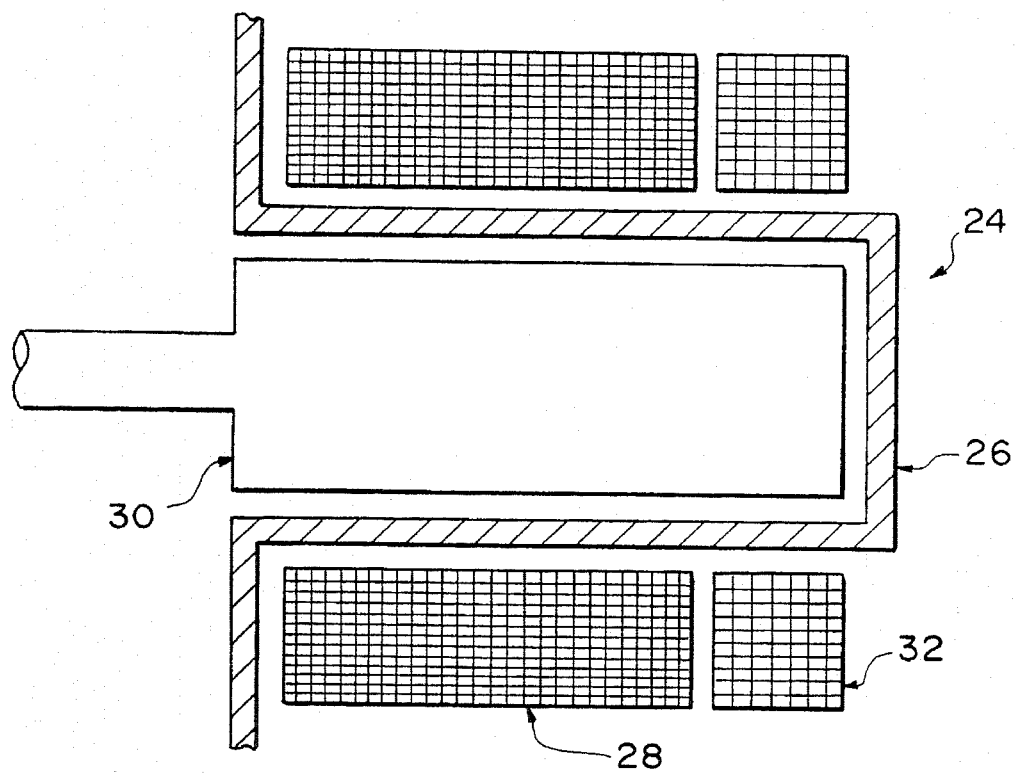
FIG. 3 is a schematic, vertical cross-sectional view of a superconducting magnet motor according to a third preferred embodiment of the present invention.

Referring now to FIG. 3, a hermetically sealed superconducting motor 24 similar to the FIG. 1 embodiment is shown using a radial gap configuration. As in the previously described embodiments, a hermetic seal 26 is provided between a stator 28 and a permanent magnet armature/shaft combination 30. In this embodiment, the stator 28 includes superconducting material. An auxiliary load matching stator 32 is used for matching motor torque to load variations, since superconducting stators in the persistent current mode operate best as constant load devices. Suitable structure can be provided to cool the stator 28 to superconducting temperatures, if needed.

As previously noted, the superconducting stators and/or superconducting armatures can be in any configuration so long as the hermetic seal is present between the stator and the armature. This allows great flexibility in developing motor components from superconducting materials and also allows for great flexibility in matching superconducting motors to particular applications.

Figure 4:
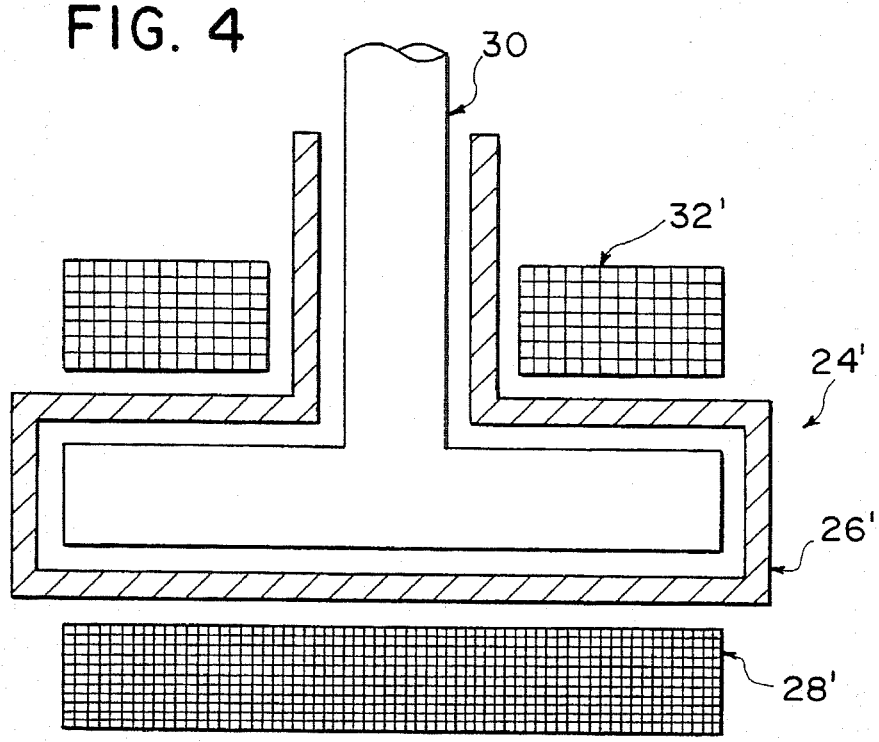
FIG. 4 is a schematic, vertical cross-sectional view of a superconducting magnet motor according to a fourth preferred embodiment of the present invention.

The embodiment of FIG. 4 is similar to the one illustrated in FIG. 3, except that the motor uses an axial gap stator and axial gap load matching stator. Equivalent, but primed, reference numerals are used in FIG. 4 to describe structure similar to that which is illustrated in FIG. 3.

The embodiments of FIGS. 3 and 4 would allow the use of a superconducting motor for normal "hermetic" applications such as refrigerators, air conditioners, etc. These configurations would have the normal armature and motor shaft inside the hermetically sealed operating system (refrigerator sealed system, etc.) with the superconducting stator located outside of the hermetic system. These variations would require that the superconducting material be made into a stator.

Figure 5:
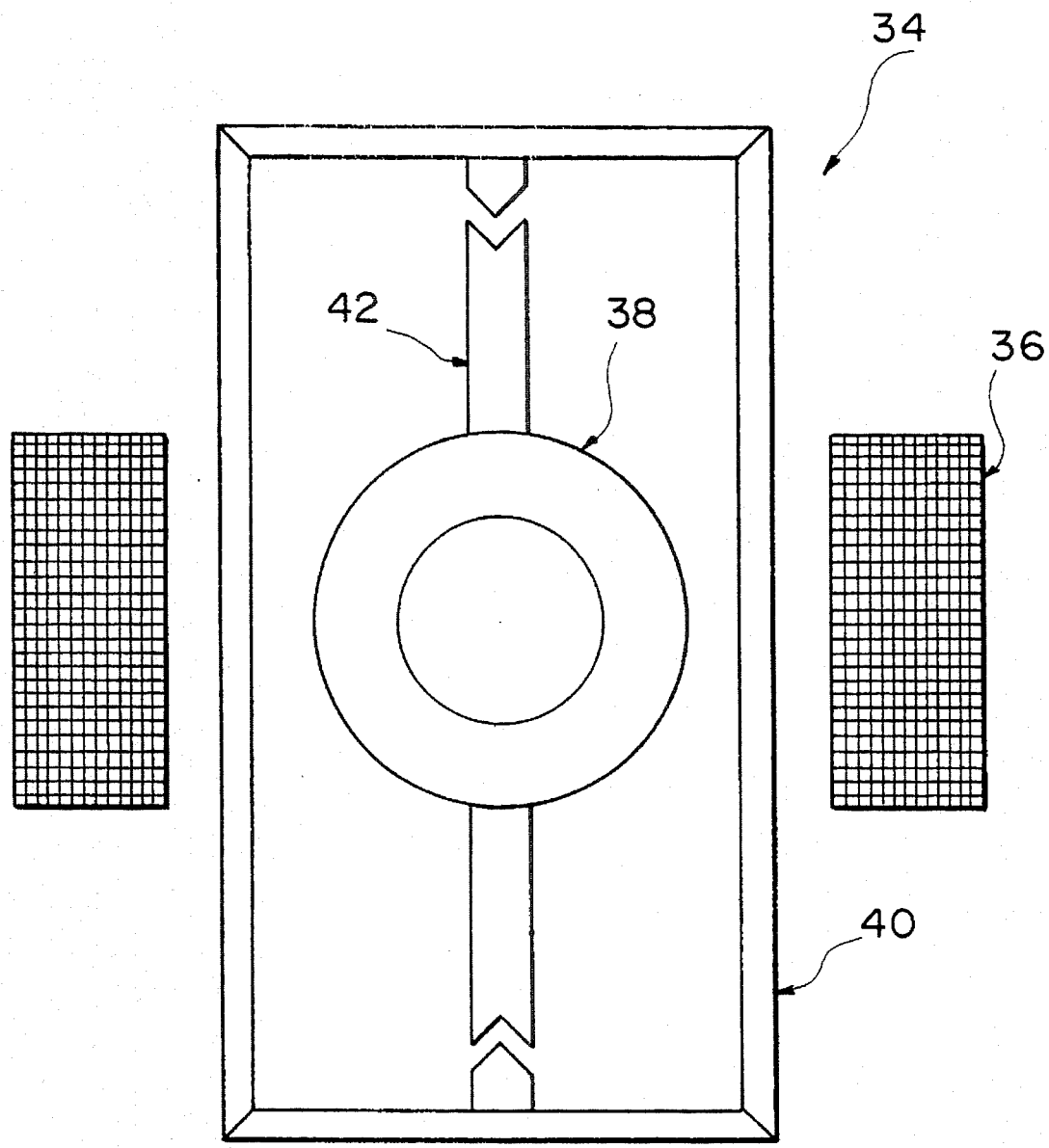
FIG. 5 is a schematic, vertical cross-sectional view of a superconducting magnet motor according to a fifth preferred embodiment of the present invention.

Referring to FIG. 5, a hermetically sealed superconducting motor 34 includes a stator 36 separated from an annularly-shaped rotor 38 by a container 40, such as a Dewar flask. The rotor 38 is made of a superconducting material. The container 40 can be a conduit for a cryogenic fluid, such as liquid nitrogen, so that fluid is pumped through the conduit by virtue of the rotation of the rotor 38. The rotor 38 is provided with non-contacting shafts 42 which facilitate rotation of the rotor 38 about a vertical rotation axis when the rotor 38 is influenced by the field generated by the stator 36. When the rotor 38 is used as a "paddlewheel" to propel fluid through the container 40, the rotor 38 can be further shaped to enhance its fluid moving capabilities.

Figure 6:
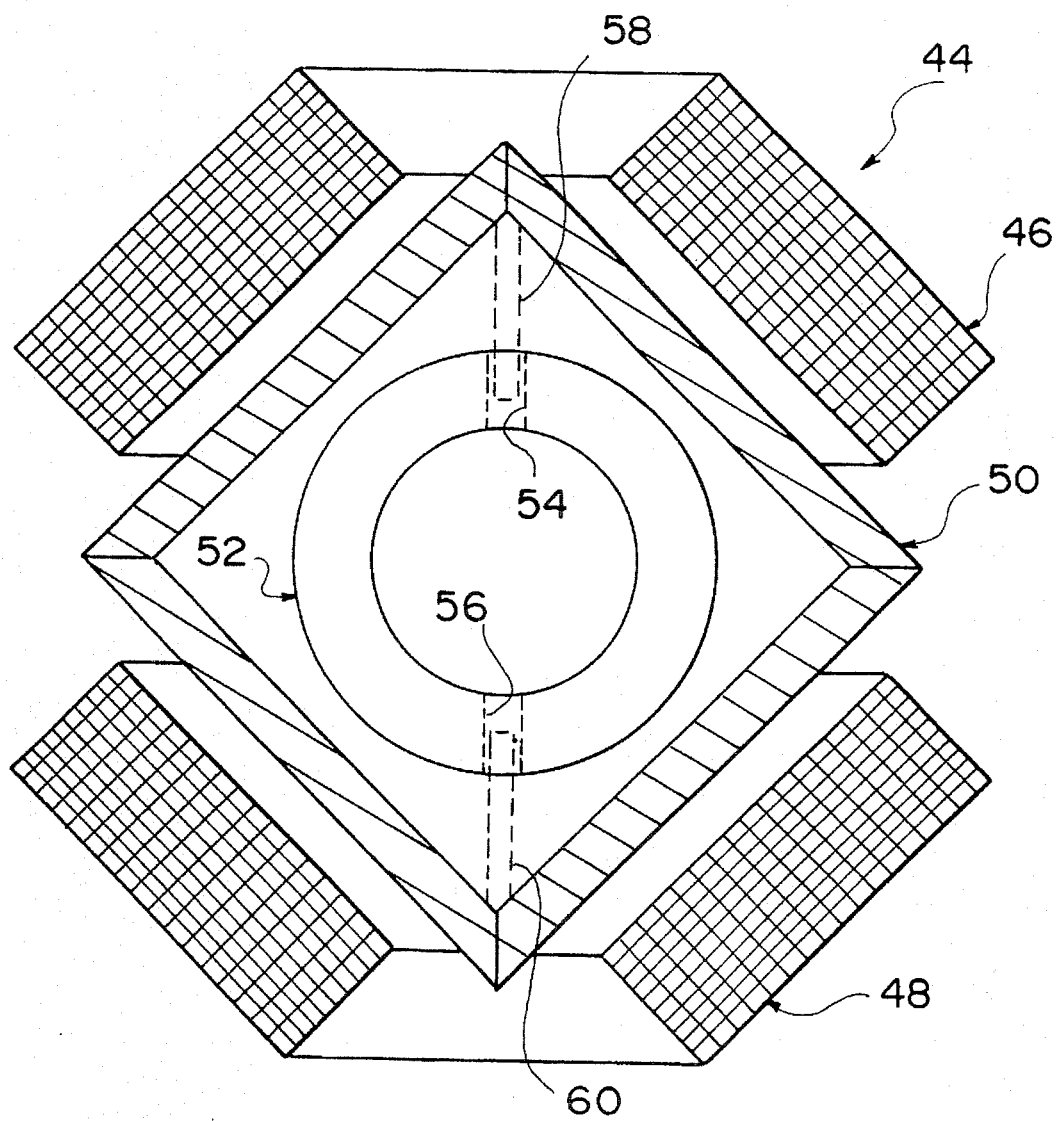
FIG. 6 is a schematic, vertical cross sectional view of a superconducting magnet motor according to a sixth preferred embodiment of the present invention.

The embodiment of FIG. 6 illustrates a hermetically sealed superconducting magnet motor 44 having two opposed conically shaped stators 46 and 48 positioned around the periphery of a container 50. An annularly-shaped rotor 52, made of superconducting material, is positioned within the container 50.

The embodiment of FIG. 6 illustrates how the present invention takes advantage of the Meissner effect, a property inherent to superconductors whereby magnetic fields are repelled by the superconductor. The Meissner effect is used to levitate the rotor 52, and thereby eliminates the need for bearings and hence breaks in the hermetically sealed container 50 which transports working fluid. The pumped fluid or cryogen must remain fluid below the critical temperature necessary to achieve superconductivity at the given magnetic field level and also under the time dependent nature or the rotating field component. Thus, the motor 44 acts as a pump and uses the Meissner effect to levitate the rotor 52 which rotates because currents are induced in the rotor 52 in a manner analogous to that found in the standard squirrel cage induction motor.

To ensure proper induction of current in the rotor 52, the rotor 52 may be provided with holes 54 and 56 at points in alignment with the vertical rotation axis. These holes cooperate with guide pins or shafts 58 and 60, respectively. The holes and pins, shown in phantom lines, ensure that the holes in the rotor 52 are aligned with the axis of rotation when the machine is at rest.

The rotor 52 may be made of solid superconducting material with appropriate materials to reduce A.C. losses or it may be made from thin strands of wire imbedded in a supporting structure as in the squirrel cage induction motor. The specific type of superconductor is not critical, and those mentioned previously can be used.

With the embodiments of FIGS. 5 and 6 in particular, the levitating Meissner effect eliminates bearings which are a common cause of failure in pumps handling cryogenic fluid and refrigerants. The Meissner effect is best used with the dual conical shaped stator configuration of FIG. 6. A power output shaft could be connected to either of the rotors 38 and 52, with suitable seals through the containers in order to transfer the motors's power to the outside environment.

Power electronics can be selected for the dual stator configuration of FIG. 6 such that a matching of pole polarity is achieved. This can be done by connecting each stator 46 and 48 to an appropriate 60 Hz A.C. power source (not shown). The conical shape of the stators can be achieved by taking commercially available axial gap stators, such as those of the type illustrated in FIGS. 1 and 4, and pulling them in an axial direction until the desired shape is achieved.

While advantageous embodiments have been chosen to illustrate the invention, it will be understood by those skilled in the art that various changes and modifications can be made therein without departing from the scope of the invention as defined in the appended claims.

What is claimed is:

1. A superconducting magnet machine comprising:

a stator;

an armature in spaced relation to the stator; and a hermetic seal between the stator and armature, one of the stator and armature including a superconducting material which, when placed at a superconducting temperature, and when at least one of the armature and stator is coupled to a source of electrical energy, applies a repulsive force between the stator and armature.

2. A superconducting magnet machine according to claim 1, wherein the armature includes a superconducting magnet made of the superconducting material and the stator includes a starting winding, and wherein the stator and armature are separated by an axial gap.

3. A superconducting magnet machine according to claim 1, wherein the armature includes a superconducting magnet made of the superconducting material and the stator includes a starting winding, and wherein the stator and armature are separated by a radial gap.

4. A superconducting magnet machine according to claim 1, wherein the armature includes a permanent magnet and the stator includes the superconducting material as a starting winding, and wherein the stator and armature are separated by a radial gap.

5. A superconducting magnet machine according to claim 4, further comprising load matching stator means for matching motor torque to load variations.

6. A superconducting magnet machine according to claim 1, wherein the armature includes a permanent magnet and the stator includes the superconducting material as a starting winding, and wherein the stator and armature are separated by an axial gap.

7. A superconducting magnet machine according to claim 6, further comprising load matching stator means for matching motor torque to load variations.

8. A superconducting magnet machine comprising:

a stator;

a rotor in spaced relation to the stator; and a hermetic seal between the stator and the rotor, one of the stator and the rotor including a superconducting material which, when placed at a superconducting temperature, and when at least one of the rotor and the stator is coupled to a source of electrical energy, applies a repulsive force between the stator and the rotor, wherein the hermetic seal comprises conduit means for communicating a cryogenic fluid.

9. A superconducting magnet machine according to claim 8, wherein the rotor is a superconducting magnet made of the superconducting material, the rotor being disposed within the conduit means and separated from the stator by a radial gap.

10. A superconducting magnet machine according to claim 9, further comprising means for positioning the rotor within the conduit means when the stator is not powered.

11. A superconducting magnet machine according to claim 10, wherein the positioning means comprises rotation shaft segments extending outwardly from diametrically opposite sides of the rotor and having formations at their distal ends which cooperate with formations formed on an inner surface of the conduit means when the machine is in a static condition.

12. A superconducting magnet machine according to claim 8, wherein the rotor is a superconducting magnet made of the superconducting material, and the stator comprises first and second conically shaped stators positioned in opposition to each other on opposite sides of the conduit means, the rotor being disposed within the conduit means and separated from the first and second stators by an axial and radial gap.

13. A superconducting magnet machine according to claim 12, further comprising means for positioning the rotor within the conduit means when the stator is not powered.

14. A superconducting magnet machine according to claim 13, wherein the rotor is generally annular in shape.

15. A superconducting magnet machine comprising:

a stator;

a rotor in spaced relation to the stator, wherein the rotor is generally annular in shape;

a hermetic seal between the stator and the rotor, one of the stator and the rotor including a superconducting material which, when placed at a superconducting temperature, and when at least one of the rotor and the stator is coupled to a source of electrical energy, applies a repulsive force between the stator and the rotor, the hermetic seal comprising conduit means for communicating a cryogenic fluid;

the rotor is a superconducting magnet made of the superconducting material, and the stator comprises first and second conically-shaped stators positioned in opposition to each other on opposite sides of the conduit means, the rotor being disposed within the conduit means and separated from the first and second conically-shaped stators by an axial and radial gap; and means for positioning the rotor within the conduit means when the stator is not powered comprising first and second guide holes formed in the rotor at diametrically opposite ends thereof, and first and second guide pins mounted within the conduit means along an intended axis of rotation of the rotor.

* * * * *